United States Patent [19]

Iwata et al.

[11] Patent Number: 5,108,714

[45] Date of Patent: Apr. 28, 1992

[54] EXHAUST GAS RECOMBINER

[75] Inventors: Katsuichi Iwata, Ichinomiya; Magoji Okamoto, Nagoya, both of Japan

[73] Assignee: NGK Insulators, Ltd., Japan

[21] Appl. No.: 594,668

[22] Filed: Sep. 13, 1990

Related U.S. Application Data

[63] Continuation of Ser. No. 322,900, Mar. 14, 1989, abandoned.

[30] Foreign Application Priority Data

Apr. 22, 1988 [JP] Japan ................ 63-101079

[51] Int. Cl.$^5$ ................................ F01N 3/00
[52] U.S. Cl. .................... 422/159; 422/171; 422/173; 422/176; 422/180; 422/195; 376/301
[58] Field of Search ............ 422/176, 159, 171, 195, 422/310, 311, 180, 173; 376/300, 301; 423/580

[56] References Cited

U.S. PATENT DOCUMENTS

| | | | |
|---|---|---|---|
| 2,847,284 | 8/1958 | Busey | 423/580 X |
| 3,597,165 | 8/1971 | Keith et al. | 422/176 X |
| 3,754,870 | 8/1973 | Carnahan et al. | 422/171 |
| 3,785,781 | 1/1974 | Hervert et al. | 422/171 |
| 3,857,927 | 12/1974 | Henrie | 376/301 X |
| 3,996,016 | 12/1976 | Wagner | 376/301 X |
| 4,008,050 | 2/1977 | Betz | |
| 4,072,471 | 2/1978 | Morgan, Jr. et al. | 422/171 |
| 4,091,616 | 5/1978 | Loweg | 422/177 X |
| 4,118,199 | 10/1978 | Völker et al. | 422/171 |
| 4,374,116 | 2/1983 | Chuang et al. | 423/580 |
| 4,556,543 | 12/1985 | Mochida et al. | 422/171 |
| 4,911,879 | 3/1990 | Heck et al. | 423/580 X |

FOREIGN PATENT DOCUMENTS 1115815  5/1968  United Kingdom .

Primary Examiner—Robert J. Hill, Jr.
Assistant Examiner—Jeffrey R. Snay
Attorney, Agent, or Firm—Parkhurst, Wendel & Rossi

[57] ABSTRACT

An exhaust gas recombiner for restoring hydrogen and oxygen gases in gases extracted from a condenser of a steam engine into water by reaction of the hydrogen and oxygen gases includes a vertical cylinder vessel having an extracted gas inlet at its lower end and an outlet at its upper end. A diameter of the vessel is substantially the same as that of an outlet piping connected to the outlet of the vessel for introducing gases leaving the vessel into an exhaust gas condenser. The apparatus further includes a plurality of units in the vessel. Each unit has a honeycomb structure for flow-rectifying gases flowing into the vessel through the extracted gas inlet and a honeycomb catalyst gas carrying on its surfaces a catalyst being positioned on an upper side of the honeycomb structure.

9 Claims, 3 Drawing Sheets

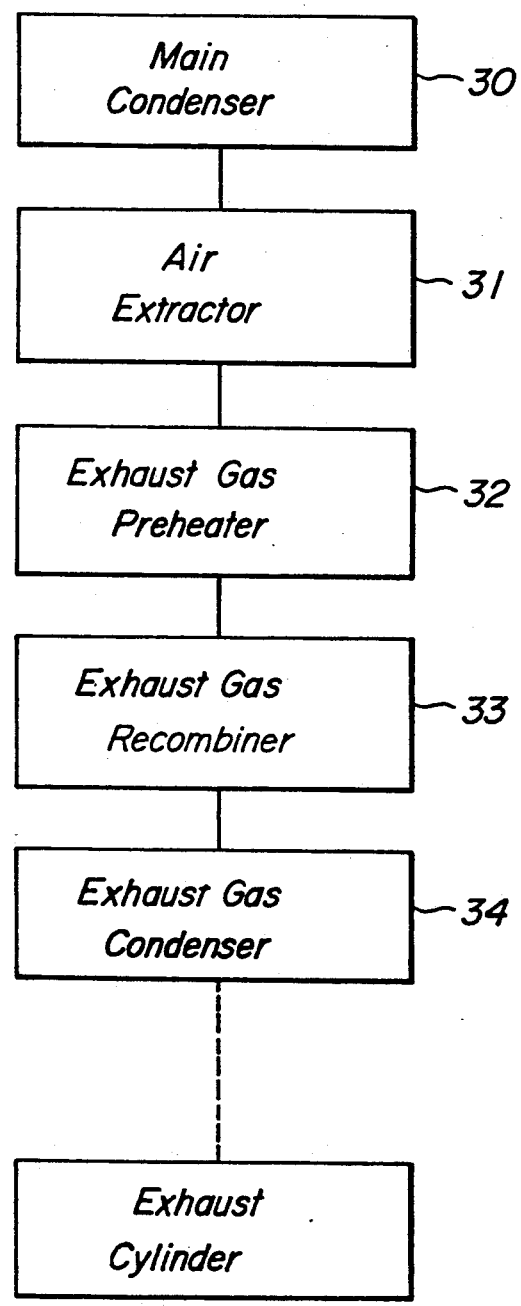
FIG_1

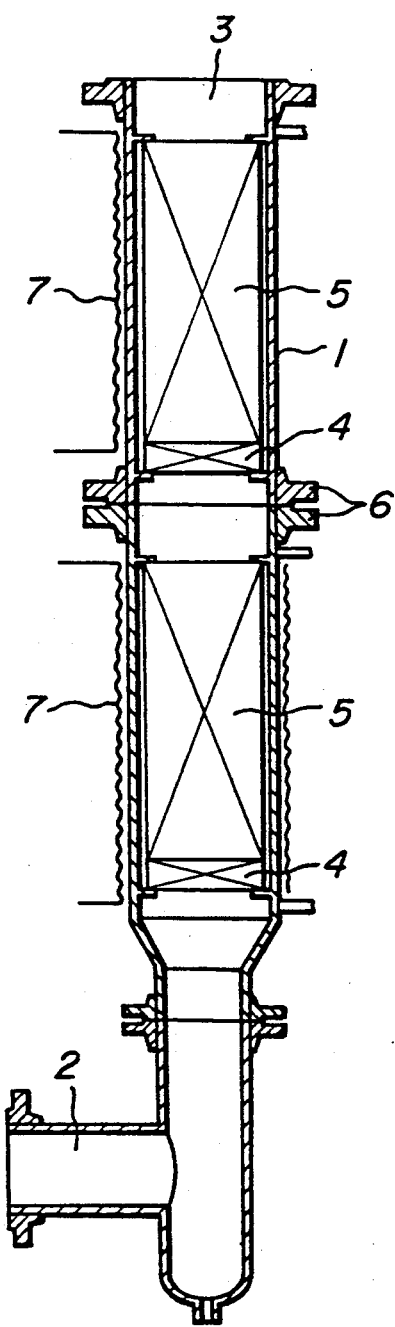
FIG_2

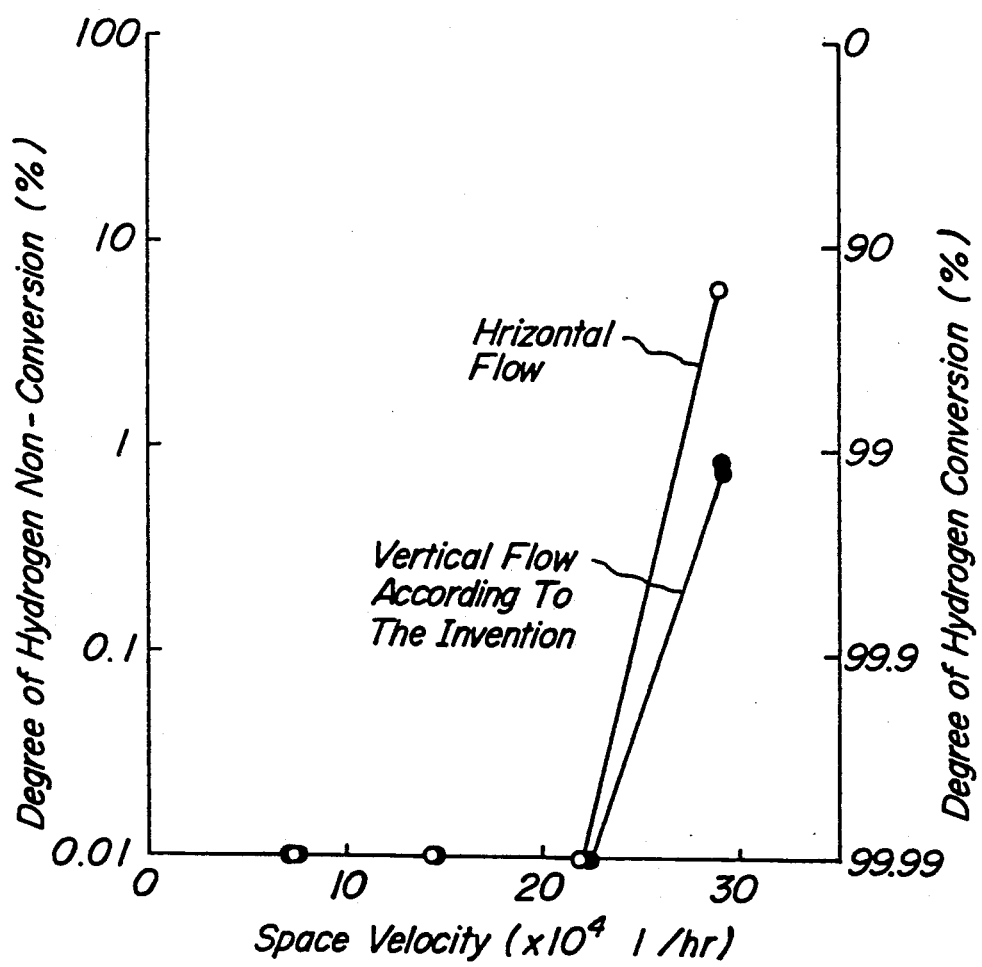
FIG_3

EXHAUST GAS RECOMBINER

This is a Continuation of application Ser. No. 07/322,900 filed Mar. 14, 1989, now abandoned.

BACKGROUND OF THE INVENTION

This invention relates to an exhaust gas recombiner for restoring hydrogen and oxygen gases in gases extracted from a condenser of a steam engine, such as a steam turbine and the like, into water by reaction of the hydrogen and oxygen gases.

With a steam engine, water vapor used for lowering back pressure is cooled by a condenser to restore it into water and the condensed water is recovered for further use. In this case, when the water vapor is mixed with air or hydrogen or oxygen gas produced by decomposition of the water vapor, the degree of a vacuum in the condenser will lower and detrimentally affect the thermal efficiency of the steam engine. As shown in FIG. 1, therefore, an air extractor 31 is connected to the condenser 30 of the steam engine to extract air, hydrogen and oxygen gases and the like from the condenser 30.

Since the steam used for a steam turbine in an atomic power station includes tritium and the like, extracted gases as they are can not be exhausted into the ambient atmosphere. Therefore, in order to reduce the volume of the extracted gases, after the gases are preheated by an exhaust gas preheater 32, hydrogen and oxygen gases are reacted with each other to produce water vapor which is then condensed in an exhaust gas condenser 34 for further use.

For such an exhaust gas recombiner 33, a unit which comprises a large tank filled with pellet catalysts each including porous alumina pellets supporting catalysts on their surfaces has been generally used. With such a hitherto used recombiner, however, in order to obtain sufficient reaction efficiency, the filled layers must be thick or bulky. Such thick filled layers exhibit various disadvantages in that pressure losses become larger, the apparatus unavoidably becomes large, and the pellet catalysts are vibrated so as to collide with each other to be pulverized with resulting deterioration of the catalysts. Thus, the construction for filling the pellet catalysts becomes complicated.

SUMMARY OF THE INVENTION

It is a primary object of the invention to provide an improved exhaust gas recombiner which eliminates all the disadvantages of the prior art and operates with less pressure losses without pulverization and deterioration of a catalyst caused by gas flows. The invention is also simple in construction and compact as a whole.

In order to achieve this object, the exhaust gas recombiner according to the invention comprises a vertical cylinder vessel having an exhausted gas inlet at its lower end and an outlet at its upper end, at least one honeycomb structure in said vertical cylindrical vessel for flow-rectifying gases flowing into the vessel through the extracted gas inlet, and at least one honeycomb catalyst carrying on its surfaces a catalyst and positioned on an upper side of said honeycomb structure.

The term "flow-rectifying" used herein is intended to mean that gas flows are conditioned to make them steady, parallel flows without causing any disturbance.

The invention will be more fully understood by referring to the following detailed specification and claims taken in connection with the appended drawings.

BRIEF DESCRIPTION OF THE DRAWINGS

FIG. 1 is one example of a block diagram of condensing process lines;

FIG. 2 is a sectional view illustrating one embodiment of the exhaust gas recombiner according to the invention; and FIG. 3 is a graph illustrating a relation between space velocities and degrees of hydrogen conversion.

DETAILED EXPLANATION OF PREFERRED EMBODIMENTS

Referring to FIG. 2 illustrating a preferred embodiment of the invention, the apparatus comprises a vertical cylindrical vessel 1 having a reduced diameter lower end, an extracted gas inlet 2 provided at the lower end, and an exhaust gas outlet 3 provided at an upper end of the vessel 1.

An extracted gas preheated to a temperature of about 140° C. by an exhaust gas preheater 32 as above described is supplied into the extracted gas inlet 2. The extracted or exhaust gas is treated in the vessel 1 to be heated to a high temperature of about 350° C. by the heat of reaction and is fed from the exhaust gas outlet 3 through an outlet piping into an exhaust gas condenser 34.

In the exhaust gas recombiner according to the invention, the vessel 1 has a diameter substantially the same as that of the outlet piping, thereby preventing pressure loss which would otherwise occur in a vessel having a reduced diameter outlet of the prior art.

There are provided in the vertical cylindrical vessel 1 honeycomb structures 4 for rectifying gas flows and honeycomb catalysts 5 in layers. Each honeycomb structure 4 used in this embodiment is cylindrical and includes therein rectangular or square cells whose pitches are of the order of 1.7–5.9 mm. The honeycomb structure 4 includes a number of through-apertures extending in axial or vertical directions formed by the cells to flow-rectify the gas flowing thereinto through the exhaust gas inlet 2 into parallel flow.

On the other hand, the honeycomb catalyst 5 is a honeycomb structure of cordierite which is coated on its surfaces with alumina on which is carried the catalyst such as platinum, palladium or the like for combining hydrogen and oxygen gases. The concentration of platinum, palladium or the like as the active component is of the order of 0.5–3 g/l.

Like the honeycomb structure 4, the honeycomb catalyst 5 includes therein rectangular or square cells with pitches of 1.7–5.9 mm. The axial length of the honeycomb catalyst 5 is very much longer than that of the honeycomb structure 4. In order to easily exchange the honeycomb structure 4 and the honeycomb catalyst 5 as one set, the vessel 1 is made separable at flanges 6 into plural parts.

Heaters 7 are provided on outer circumferential surfaces of the vessel 1 so that the inner temperature of the vessel 1 is kept constant by on-off control of the heaters 7, thereby accomplishing a stable reaction.

In using the recombiner, an extracted gas including, for example, 3.2 volume % of hydrogen gas and 1.6 volume % of oxygen gas is obtained from the main condenser 30 by means of the air extractor 31. The extracted gas is preheated to about 140° C. in the exhaust gas preheater 32 and is then introduced through the extracted gas inlet 2 into the vessel 1. The extracted gas is flow-rectified into parallel flows by the honeycomb structure 4 and then passes through the honeycomb catalyst 5 arranged above the honeycomb structure 4. During such a passage through the honeycomb catalyst 5, the hydrogen and oxygen gases in the extracted gas are recombined with each other by the action of the catalyst to convert them into water vapor. The water vapor is then fed into the exhaust gas condenser 34 through the outlet piping connected to the exhaust gas outlet 3 at the upper end of the vessel 1 which has substantially the same diameter as that of the vessel 1. The water vapor is condensed in the exhaust gas condenser 34 and the condensed water is then returned to the original circulating system.

The performance of the exhaust gas recombiner of this kind is estimated by degree of hydrogen conversion %. In this case, the degree of hydrogen conversion is indicated by ($H_2$ concentration on the inlet side—$H_2$ concentration on the outlet side)/$H_2$ concentration on the inlet side (%). As shown in FIG. 3, with the exhaust gas recombiner according to the invention, the degree of hydrogen conversion was 99.99% when space velocity was $15 \times 10^4$ l/hr and also when space velocity was $21.6 \times 10^4$ l/hr. When space velocity was $28.8 \times 10^4$ l/hr, the degree of hydrogen conversion was 99.19%.

Data shown by a white circle in FIG. 3 indicate when the vessel 1 is horizontal. Within a range of the space velocity less than $21.6 \times 10^4$ l/hr, the horizontal type apparatus exhibited substantially the same effect as that of the vertical type apparatus. In the case of the space velocity of $28.8 \times 10^4$ l/hr, the degree of hydrogen conversion with the horizontal type apparatus lowered to 93.7%. The reason why the vertical type apparatus is superior to the horizontal type is probably based on the fact that vertically flowing hydrogen gases in the vertical type apparatus are more sufficiently mixed with each other than in the horizontal type because the hydrogen gases are lighter than the air.

With the apparatus according to the invention, the honeycomb structures 4 and the honeycomb catalysts 5 are provided in the vertical cylindrical vessel 1 without arranging any moving members in the vessel as used in the prior art. Therefore, no collision and pulverization of the catalysts occurs and hence their deterioration scarcely occurs.

Moreover, the gases introduced into the extracted gas inlet 2, provided at the lower end of the apparatus, is flow-rectified into parallel flow and then passes through the through-apertures of the honeycomb catalysts 5 in the form of honeycomb structures. In this manner, the apparatus according to the invention can reduce the pressure losses to the order of one fiftieth of those in the prior art.

As shown by the data of the embodiments, a high degree of hydrogen conversion can be accomplished by the feature of the invention in conjunction with the vessel 1 in the form of a vertical cylinder. Even if the diameter of the vessel 1 is made substantially the same as that of the outlet piping, the apparatus can exhibit sufficient performance as a recombiner. Therefore, it is possible to minimize the entire apparatus to a size less than one fiftieth of that of the prior art. Moreover, since the exhaust gas recombiner is small, a plurality of the apparatuses may be arranged in parallel so that if catalysts of one apparatus are deteriorated, the apparatus can be immediately replaced with another apparatus.

As can be seen from the above explanation, the exhaust gas recombiner according to the invention can maintain the high degree of hydrogen conversion within the range of high space velocity with less pressure losses without causing any pulverization and deterioration of catalysts caused by gas flow. In addition the apparatus is simple in construction and compact as a whole. Therefore, the apparatus according to the invention eliminates all disadvantages of the prior art and greatly contributes to the development of industry. The apparatus according to the invention, of course, is applicable to not only steam turbines in atomic power stations but also condensing process lines of general steam prime movers.

While the invention has been particularly shown and described with reference to preferred embodiments thereof, it will be understood by those skilled in the art that the foregoing and other changes in form and details can be made therein without departing from the spirit and scope of the invention.

What is claimed is:

1. In an exhaust gas recombiner for combining hydrogen and oxygen to form water, the improvement comprising:
   at least one vertical cylindrical vessel having an exhaust gas inlet at a lower end thereof and a gas outlet at an upper end thereof;
   at least one honeycomb structure disposed in said at least one vessel for flow-rectifying exhaust gas entering said at least one vessel through said exhaust gas inlet; and
   at least one honeycomb catalyst positioned above and directly contacting said at least one honeycomb structure and having a catalyst material deposited on surfaces thereof for recombining said exhaust gas.

2. The exhaust gas recombiner of claim 1, further comprising a piping connected to said gas outlet for introducing gas leaving said vessel into a condenser, wherein the diameter of said piping is substantially the same as that of said gas outlet.

3. The exhaust gas recombiner of claim 1, wherein said at least one honeycomb structure is cylindrical and has a plurality of rectangular, longitudinally extending cells, each of said cells being separated by 1.7-5.9 mm.

4. The exhaust gas recombiner of claim 1, wherein said at least one honeycomb catalyst is cylindrical and has a plurality of rectangular, longitudinally extending cells, each of said cells being separated by 1.7-5.9 mm.

5. The exhaust gas recombiner of claim 1, wherein said at least one honeycomb catalyst consists of cordierite, said surfaces being coated with alumina upon which said catalyst is deposited.

6. The exhaust gas recombiner of claim 1, further comprising heating means disposed about said at least one vessel for maintaining a constant temperature within said at least one vessel.

7. The exhaust gas recombiner of claim 1, wherein said at least one vessel comprises a plurality of units, each unit consisting of said at least one honeycomb structure and said at least one honeycomb catalyst above said at least one honeycomb structure, said units being stacked on top of each other.

8. The exhaust gas recombiner of claim 7, further comprising flanges connecting said units together such that said at least one vessel is separable at said flanges, thereby facilitating exchange of said units.

9. The exhaust gas recombiner of claim 1, comprising a plurality of said vessels, wherein each of said vessels comprises at least one unit, each unit consisting of said at least one honeycomb structure and said at least one honeycomb catalyst positioned above and directly contacting said at least one honeycomb structure, said plurality of vessels being arranged in parallel.

* * * * *

UNITED STATES PATENT AND TRADEMARK OFFICE
CERTIFICATE OF CORRECTION

PATENT NO. : 5,108,714

DATED : April 28, 1992

INVENTOR(S) : Katsuichi IWATA et al.

It is certified that error appears in the above-identified patent and that said Letters Patent is hereby corrected as shown below:

On the title page, Item [56]

"FOREIGN PATENT DOCUMENTS" insert --64-4235  1/1989 Japan--.

Signed and Sealed this

Twenty-second Day of June, 1993

Attest:

MICHAEL K. KIRK

Attesting Officer  Acting Commissioner of Patents and Trademarks